United States Patent [19]

Kikuchi et al.

[11] Patent Number: 5,623,533

[45] Date of Patent: Apr. 22, 1997

[54] MOBILE COMMUNICATION END DEVICE WITH LOW POWER OPERATION MODE

[75] Inventors: Takafumi Kikuchi; Yuji Hatano, both of Kodaira; Koichi Seki, Hino; Masanori Otsuka, Konosu; Masao Hotta, Han-no; Yasuyuki Murakami, Yokohama, all of Japan

[73] Assignee: Hitachi, Ltd., Tokyo, Japan

[21] Appl. No.: 621,896

[22] Filed: Mar. 26, 1996

Related U.S. Application Data

[63] Continuation of Ser. No. 107,318, Aug. 17, 1993, abandoned.

[30] Foreign Application Priority Data

Aug. 18, 1992 [JP] Japan ................................. 4-218917
Sep. 3, 1992 [JP] Japan ................................. 4-235625

[51] Int. Cl.⁶ .................................................. H04Q 7/32
[52] U.S. Cl. ........................... 379/58; 455/38.3; 455/343; 455/89
[58] Field of Search ............................ 379/58, 59, 61; 341/156, 163; 395/750; 455/33.1, 54.1, 38.3, 127, 343, 89, 90

[56] References Cited

U.S. PATENT DOCUMENTS

| | | | |
|---|---|---|---|
| 4,417,233 | 11/1983 | Inoue et al. | 341/156 |
| 4,860,005 | 8/1989 | DeLuca et al. | 455/343 X |
| 4,910,752 | 3/1990 | Yester, Jr. et al. | 455/343 |
| 5,095,308 | 3/1992 | Hewitt | 455/343 X |
| 5,204,986 | 4/1993 | Ito et al. | 455/343 |
| 5,206,650 | 4/1993 | Parle et al. | 341/163 |
| 5,287,525 | 2/1994 | Lum et al. | 395/750 |
| 5,365,226 | 11/1994 | Morishima | 455/38.3 X |

FOREIGN PATENT DOCUMENTS 0280931  11/1989  Japan ................................. 455/38.3

*Primary Examiner*—Curtis Kuntz
*Assistant Examiner*—William G. Trost
*Attorney, Agent, or Firm*—Antonelli, Terry, Stout & Kraus, LLP

[57] ABSTRACT

In a mobile wireless communication end device having an electric power source including a cell, and a signal processing part and a transmitting-receiving part, to which electric power is applied from the electric power source, operation is performed in operation mode selected previously by the user when voltage of the electric power source is dropped. The signal processing part and the transmitting-receiving part have a normal operation mode operating at normal electric power and a low power operation mode operating at electric power lower than the normal operation mode. The mobile wireless communication end device includes operation mode setting apparatus for previously setting the operation mode of the device, observing apparatus for observing the voltage of the cell of the electric power source and generating a low power operation request signal when the voltage becomes a prescribed value or less, and apparatus for changing the signal processing part and the transmitting-receiving part to low power operation mode, when the low power operation mode is set by the operation mode setting means and the low power operation request signal is generated by the observing apparatus.

20 Claims, 15 Drawing Sheets

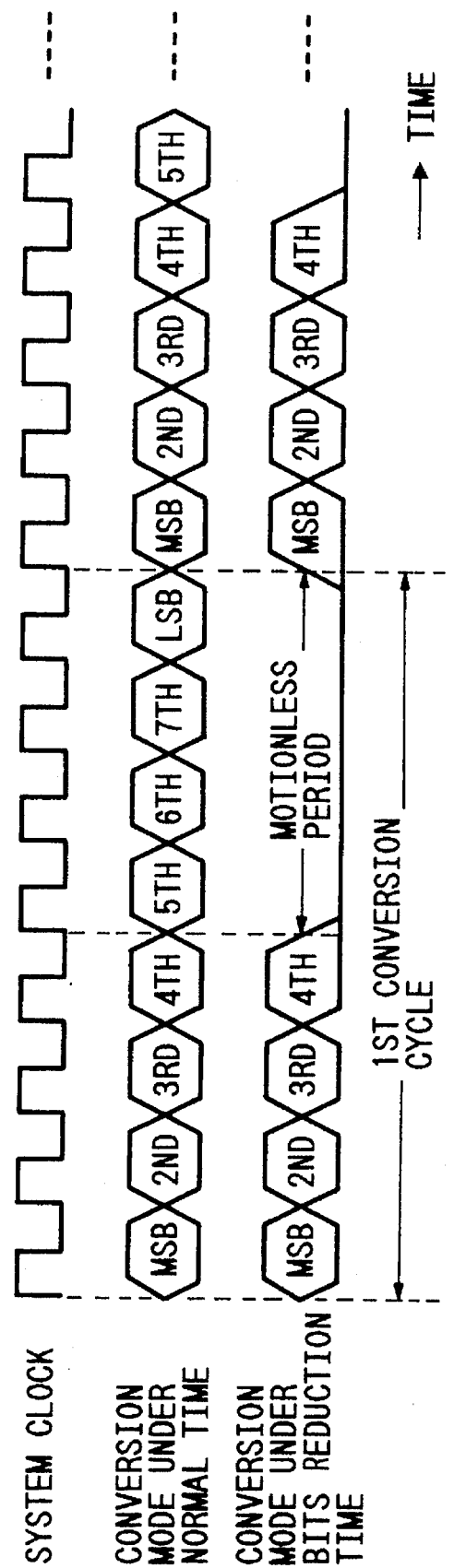

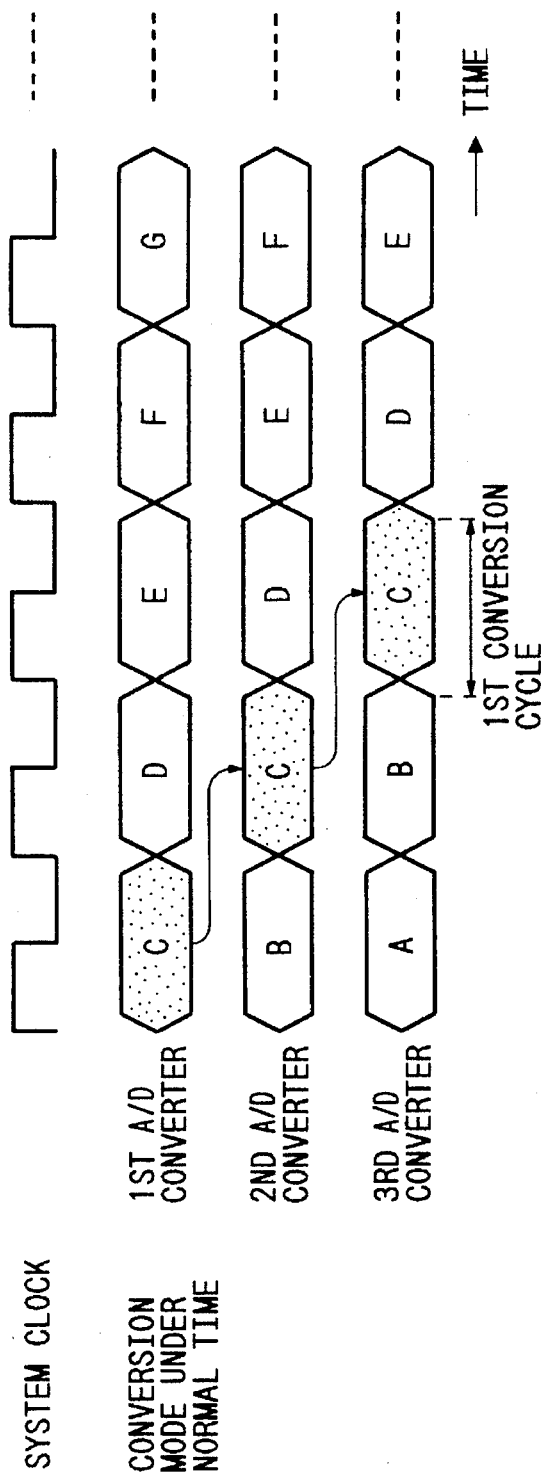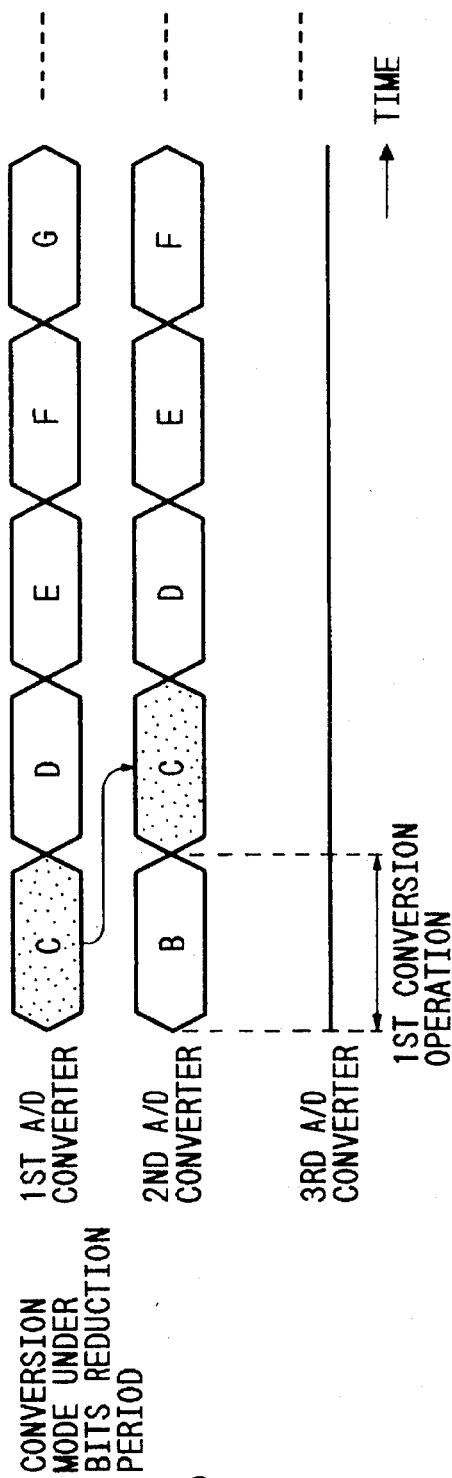
FIG. 19A
FIG. 19B

MOBILE COMMUNICATION END DEVICE WITH LOW POWER OPERATION MODE

This application is a continuation of application Ser. No. 08/107,318, filed on Aug. 17, 1993, now abandoned.

BACKGROUND OF THE INVENTION

(1) Field of the Invention

The present invention relates to mobile communication end devices, and more specifically to a wireless communication end device used in carried state by a user, where a cell is used as an electric power source of a communication end device of mobile wireless communication system, a cordless telephone or the like.

(2) Description of the Prior Art

Mobile wireless communication system is constituted by a base station and a mobile wireless communication end device performing wireless communication with the base station. In a mobile wireless communication end device carried by a user, a cell is mainly used as its electric power source so as to make it more portable. Therefore in a mobile wireless communication end device similar to other electronic device driven by a cell, continuity is dependent on life of the cell.

Also a cordless telephone spreads widely in society because of simplicity that it may be used in any talking station, but since a part called a child device or a handset in general is carried by a user, a cell is used in its electric power source. Consequently, continuity of a cordless telephone similar to that of a mobile wireless communication end device is dependent on life of the cell.

On the other hand, in order to deal with consumption of an electric power source of an electronic device driven by a cell, such as an electronic calculator, a television or the like, for example, as disclosed in Japanese Patent Laid-Open No. 61-262826, such measure is known that voltage of a cell is observed and when the voltage falls, consumed power of the device is reduced in comparison with normal state.

With the spread of a mobile wireless communication end device or a handset, its use methods are various and regarding a use method also when power of a cell is consumed, a flexible method reflecting intention of a user is desired. Under environment where cell exchange or charging is easy, in most cases, even if the cell is consumed, it is desired that use is continuous normally without deteriorating performance. Under environment where a cell or substitute communication means is not available easily, even if the cell is consumed, it is desired that minimum required performance, for example, transmission performance be maintained as long as possible.

In the invention in Japanese Patent Laid-Open No. 61-262826 as above described, however, the main point is put on extension of the cell only and any means of reflecting the intention of the user regarding use method at consumption state of the cell is not mentioned. Also lowering of operation frequency is mentioned as means for reducing the consumed power and it cannot be applied intact to communication system which must be operated in a definite frequency.

SUMMARY OF THE INVENTION

An object of the present invention is to provide a mobile wireless communication end device or a communication end device such as a handset of a cordless telephone where a method to deal with consumption of a cell is previously selected by a user, and when the cell is consumed, the consumed cell can be effectively used in the method selected by the user.

Another object of the present invention is to provide an AD converter suitable for a wireless communication end device which can control consumed power.

In order to attain the foregoing objects, a communication end device of the present invention comprises a signal processing part and a transmitting-receiving part having normal operation mode operating at normal power and low power operation mode operating at low power, and further means for previously setting operation mode where electric power source voltage becomes prescribed value or less, observing means for observing electric power source voltage, and means for performing operation in the previously set operation mode on receiving output of the observing means. When voltage is dropped, if low power operation mode is set, operation of a part in the circuit is stopped or subjected to function lowering, and if normal operation mode is set, the normal operation is continued.

Also when the low power operation mode is set, as effective means for stopping operation of a part in the circuit or subjecting it to function lowering, an AD converter to be used in the signal processing part is constituted by providing means for varying resolution of encoding or quantization level, and in the normal operation mode, encoding is performed at high resolution and in the low power operation mode, encoding is performed at low resolution.

According to the above-mentioned constitution, a user can select operation when power of a cell is consumed corresponding to use environment by his own will. When the user selects low power operation mode, function is slightly lowered and consumed power is reduced thereby talking continuity can be extended. If the user does not desire the lowering of function, the talking continuity is not extended and the normal operation can be still continued.

BRIEF DESCRIPTION OF THE DRAWINGS

FIG. 15 is a timing chart of the AD converter in FIG. 14;

FIGS. 19A and 19B are timing charts explaining operation of the pipeline AD converter in FIG. 18;

DESCRIPTION OF PREFERRED EMBODIMENTS

Embodiments of the present invention will be described referring to the accompanying drawings as follows.

Figure 1:
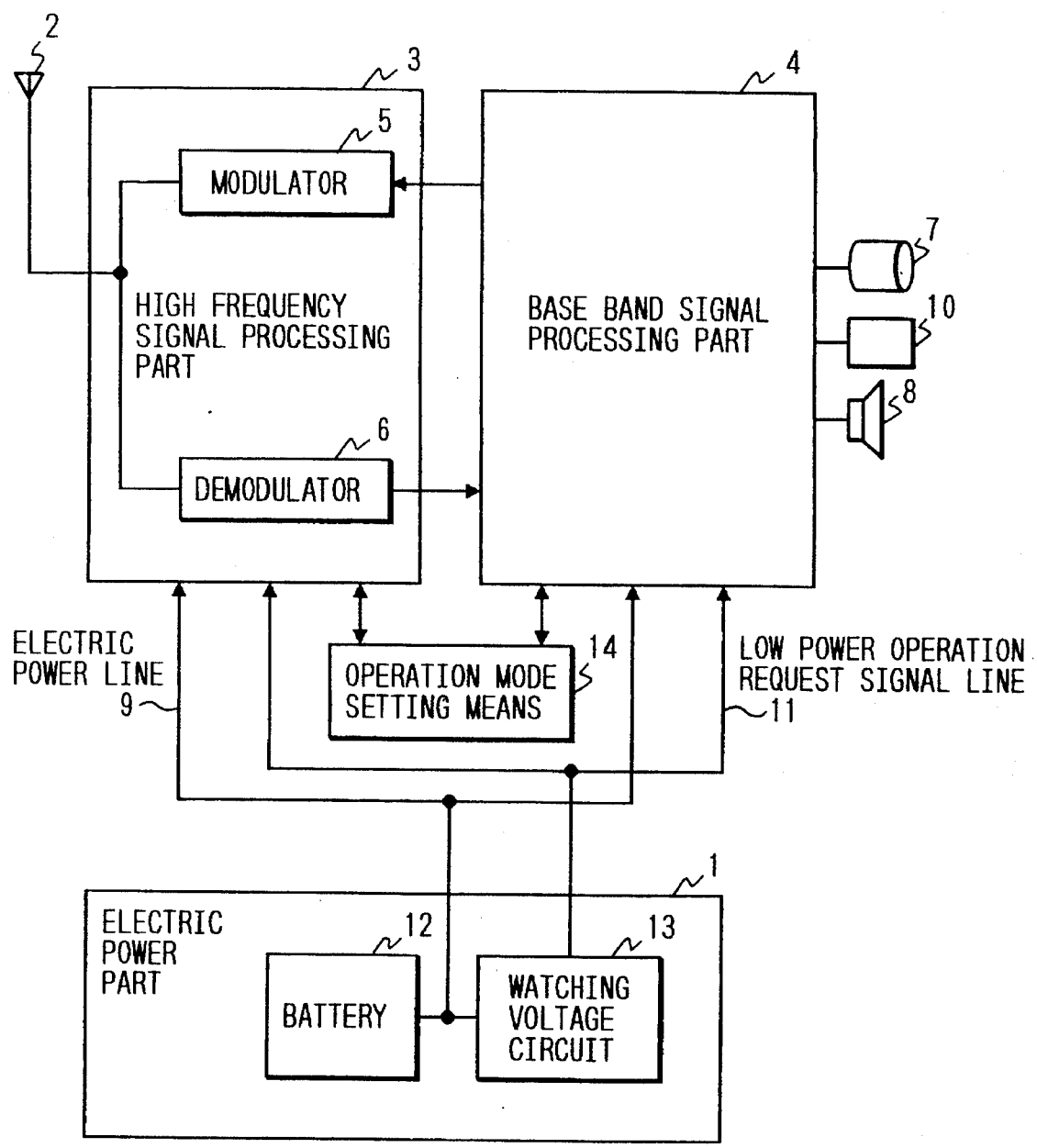
FIG. 1 is a block diagram showing constitution of a first embodiment of a mobile wireless communication end device according to the invention.

FIG. 1 is a block diagram showing constitution of a first embodiment of a mobile wireless communication end device (hereinafter referred to as "end device") according to the present invention.

In FIG. 1, numeral 1 designates an electric power part, numeral 2 designates an antenna of a transmitting-receiving part, numeral 3 designates a high frequency signal processing part, and numeral 4 designates a base band signal processing part. The signal processing part 3 has a modulator 5 and a demodulator 6. Numeral 7 designates a microphone of the transmitting-receiving part, and numeral 8 designates a speaker. Numeral 9 designates an electric power line, and numeral 10 designates an I/O and display part. Numeral 11 designates a low power operation request signal line, numeral 12 designates a cell, and numeral 13 designates a voltage watching circuit. Numeral 14 designates an operation mode setting means for a user to set operation mode of a communication end device when power of a cell is consumed, thereby the user selects either normal operation mode to continue normal operation even when power of the cell is consumed or low power operation mode to reduce the consumed power. When the low power operation mode is selected, further selection is performed either that mode is changed automatically or that mode is changed after report to the user through the I/O and display part 10. Various combination of both outputs of the low power operation request signal line 11 and the operation mode setting means 14 is realized.

Next, action of each part in FIG. 1 will be described. Voice of a user inputted to the microphone 7 in the speaking condition is subjected to necessary signal processing in the base band signal processing part 4, and further inputted to the modulator 5 within the high frequency signal processing part 3 and subjected to modulation and then outputted as aerial electric power from the antenna 2. Also the aerial electric power received by the antenna 2 is demodulated in the demodulator 6 and supplied to the base band signal processing part 4 and subjected to signal processing there and then outputted from the speaker 8. The I/O and display part 10 outputs and displays information such as number of destination in the speaking condition or consumption of the cell, with an input part such as a dial or a ten key pad for inputting the number of destination for the speaking.

In FIG. 1, the antenna 2 is expressed in that one antenna is used for transmission and reception, but separate antennas may be used for transmission and reception and further a plurality of antennas may be used only for reception. Also inner processing of the base band signal processing part 4 or the high frequency signal processing part 3 may be analog signal processing or digital signal processing. Further although interface to the user is expressed by the microphone 7 and the speaker 8, these may be, for example, kind of connector for a computer.

Usually, the electric power part 1 is an ordinary dry cell or a rechargeable battery. The electric power part 1 supplies voltage to each part by the electric power line 9. The voltage watching circuit 13 always observes output voltage of the cell 12, and when the voltage is lowered to some specified value, low power operation request signal is outputted to the low power operation request signal line 11. On receiving the low power operation request signal, the I/O and display part 10 displays consumption of the cell and urges charging or exchange of the cell 12 to the user. Also when low power operation mode is set in the operation mode setting means 14, it is automatically displayed in the display part 10 and then the high frequency signal processing part 3 and the base band signal processing part 4 becomes the low power operation mode thereby load of the cell becomes light and extension of residual operation time is intended.

Figure 2:
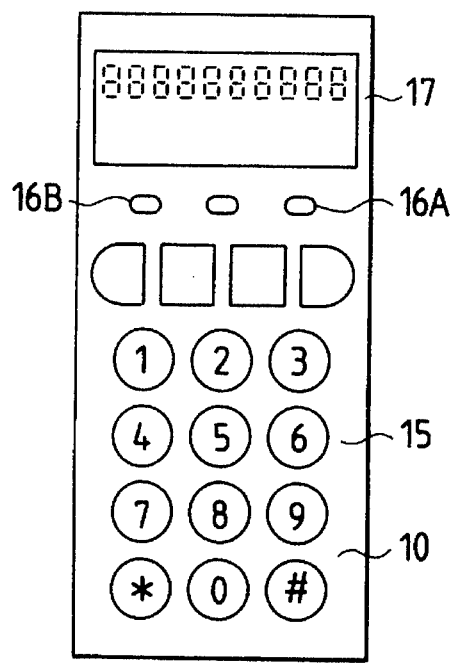
FIG. 2 is a diagram showing a constitution example of an I/O and display part in the first embodiment.

FIG. 2 shows a constitution example of the I/O and display part 10. An input key 15 has, for example, a ten key for dial and an auxiliary function key performing service such as residual, reserve, hooking in one-touch operation. A display lamp 16A uses an LED (light emitting diode) or the like and displays the present condition of the end device, such as the speaking condition, the waiting-for-call condition. Numeral 16B designates a cell consumption display lamp made of also LED. In a display 17, an LCD (liquid crystal display) or the like is used and information such as number of destination or the present condition of the end device is displayed.

Operation of the I/0 and display part 10 in the cell consumed condition will be described. In the electric power part 1, when the voltage watching circuit 13 detects fall of voltage of the cell 12 and low voltage operation request signal is outputted to the low voltage operation request signal line 11, the base band signal processing part 4 receiving the low power operation request signal ignites the display lamp 18 of the I/O and display part 10 along setting of the operation mode setting means 14 or displays sign of cell exchange by figure or character string or residual speaking time presumed from discharge time of the cell onto the display 19. When the automatic mode changing is set by the operation mode setting means 14, the display is omitted thereby the power consumption of the cell can be suppressed.

Figure 3:
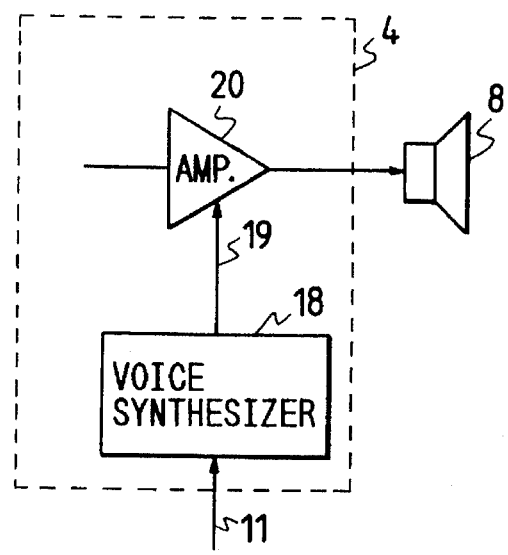
FIG. 3 is a diagram showing a constitution example of surroundings of a speaker in the first embodiment.

FIG. 3 shows constitution of other display means when power of the cell is consumed. A speech synthesizer 18 is assembled in a base band signal processing part 4 and a voice output part 8 is used in place of an I/O and display part 10. When low power operation request signal is outputted to a low power operation request signal line 11 and supplied to the voice synthesizer 18, message urging exchange of a cell or charging of a rechargeable battery is outputted by the voice synthesizer 18 and then outputted through a synthesized signal output line 19 and an amplifier 20 from a speaker 8. This output is made that simulating human voice, i.e., buzzer signal. Also residual speaking time presumed from discharge curve of the cell is outputted in voice. Further, two methods, display to the display or the like and the voice output, are possessed together and may be used simultaneously or used in changing automatically or by desire of the user.

Figure 4:
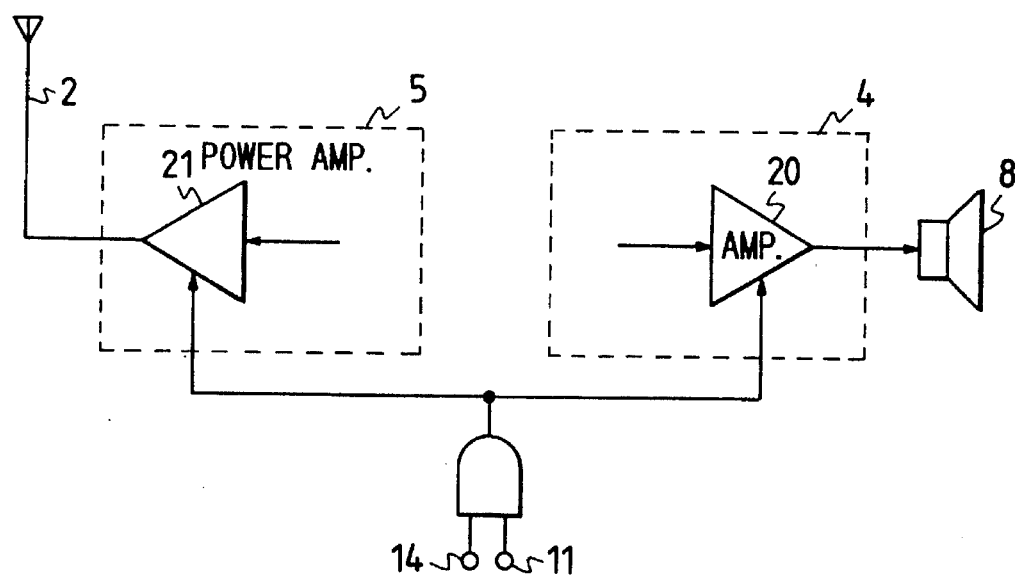
FIG. 4 is a diagram showing a constitution example of a voice output part and surroundings of a modulation part in the first embodiment.

Next, means for realizing the low power operation mode in the signal processing parts 3, 4 will be described. FIG. 4 is a diagram showing constitution of the signal processing parts 3, 4 and surroundings of the transmitting-receiving part. Voice signal outputted from the base band signal processing part 4 is amplified in the amplifier 20 and then supplied to the speaker 8. Here in the case that the amplifier 20 is an amplifier of variable gain and the low power operation mode is set by the operation mode setting means 14, on receiving signal from the low power operation request signal line 11, the gain is decreased thereby the power consumption is reduced and moving to the low power operation mode is performed.

On the other hand, the transmission signal modulated in the modulator 5 of the high frequency signal processing part 3 is amplified by the power amplifier 21 and outputted as aerial electric power from the antenna 2. Here, the power amplifier 21 is an amplifier of variable gain, and when the power source voltage is lowered and signal is received from the low power operation request signal line 11, the amplification factor is varied and reduction of the power consumption is intended.

Figure 5:
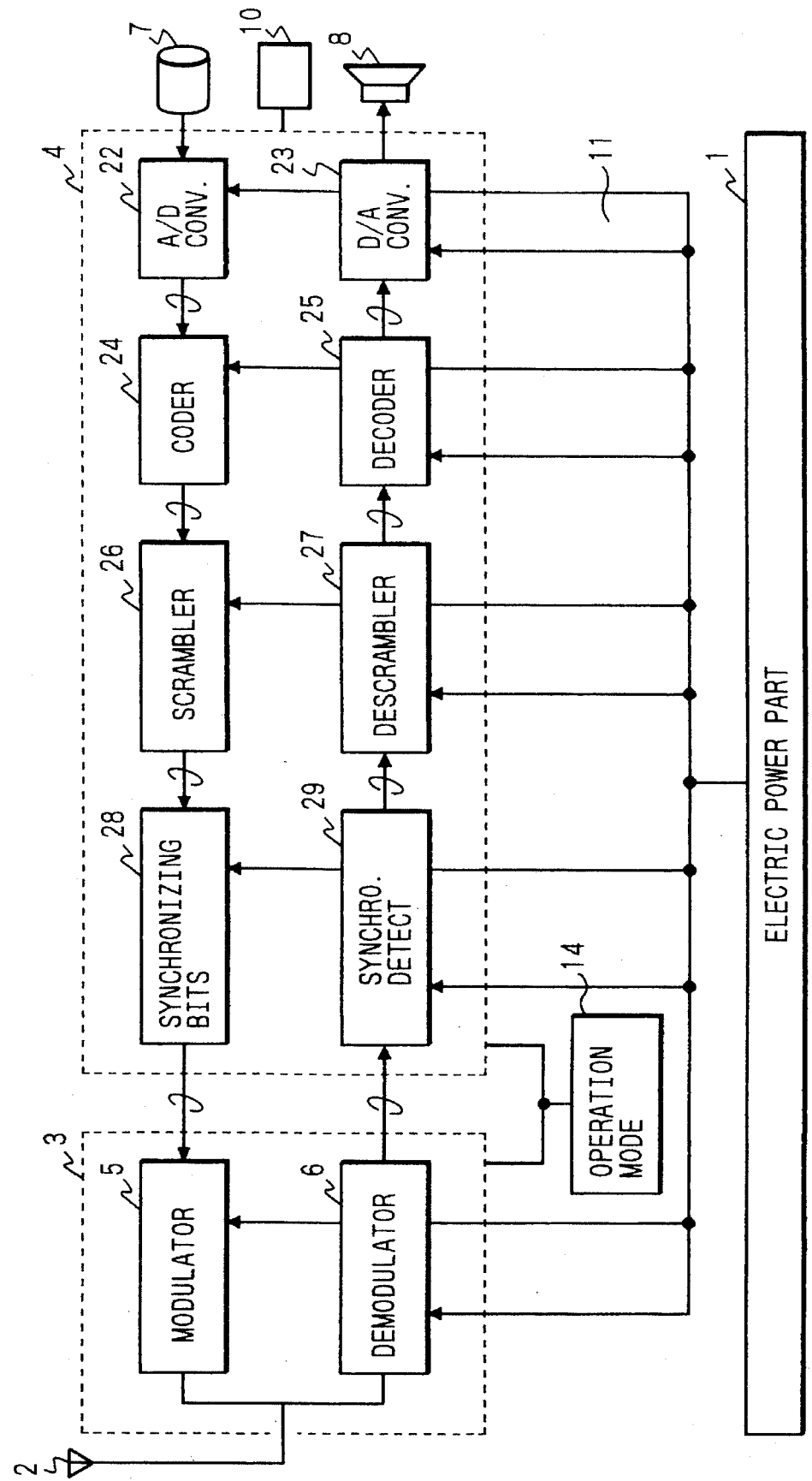
FIG. 5 is a diagram showing a constitution example of a second embodiment of a mobile wireless communication end device according to the invention.

FIG. 5 shows constitution of a second embodiment of a mobile wireless communication end device according to the present invention. In this embodiment, inner processing is performed in digital processing.

Voice signal inputted from a microphone 7 is converted from analog signal into digital signal by an AD converter 22 within a base band signal processing part 4 and subjected to processing such as compression by a coder 24, and then subjected to encryption in a scrambler 26 and subjected to processing of frame fabrication in a circuit such as addition of synchronizing bit 28 and passes through a modulator 5 within a high frequency signal processing part 3 and is outputted as aerial electric power from an antenna 2.

Reversely, the aerial electric power outputted from the antenna 2 passes through a demodulator 6 within the high frequency signal processing part 3 and is supplied to the base band signal processing part 4 and synchronized in a synchronization detector 29 and subjected to processing of release of encryption in a descrambler 27, and signal is developed in a decoder 25 and converted into analog signal in a DA converter 23 and outputted from a speaker 8. An electric power line 9 is omitted for simplification of the drawings.

When low power operation mode is set previously in an operation mode setting means 14 and a low power operation request signal is inputted from a low power operation request signal line 11, low power operation mode occurs. As a result, the bit number of coded digital signals to be processed by each part within the signal processing parts 3, 4 is decreased and operation of a circuit in some part is stopped thereby consumption power of the circuit is reduced. For example, if the AD converter 22 has digital output of 12 bits normally, on receiving signal from the low power operation request signal line 11, operation of the circuit in lower 2 bits is stopped and only upper 10 bits are outputted. Since the outputted signal is the same in amplitude but the resolution or the quantization level number is lowered, quality of the transmission signal is deteriorated but the speaking is possible sufficiently. Also in other parts, processing of lower bits is stopped thereby the consumed amount of electric power is reduced. Particularly the output bit number of the DA converter 23 in the voice output system is decreased, thereby quality of the voice output from the talking destination is lowered resulting in reporting the power consumption of the cell to the user.

Figure 6:
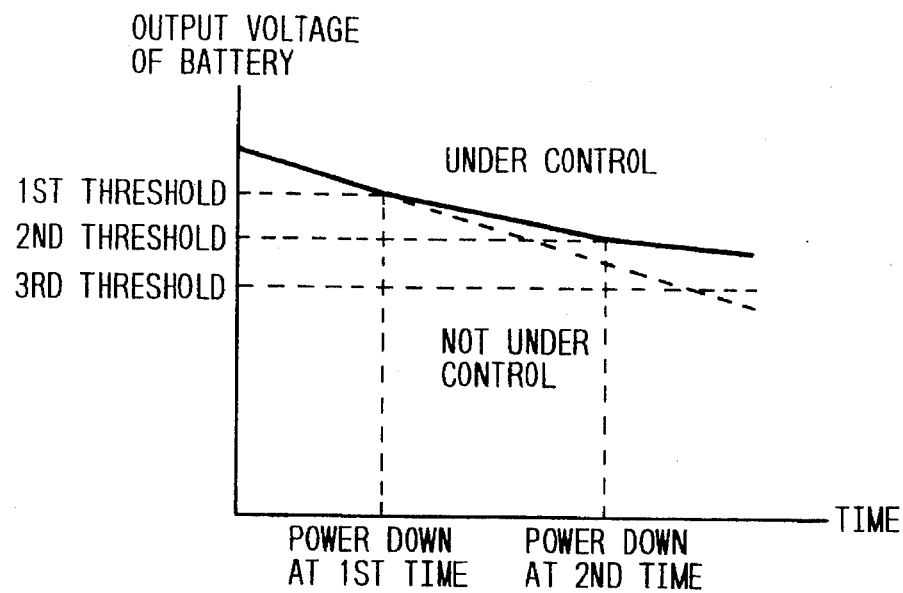
FIG. 6 is a diagram explaining an example of reducing consumed power at multiple stages in the second embodiment.

Also when processing of each part in the signal processing parts 3, 4 is digital signal processing, as described in FIG. 6, with the power consumption of the cell, the bit number to be processed is decreased stepwise thereby the consumed amount of electric power may be reduced stepwise.

In addition, an embodiment of the AD converter 22 will be described in detail in FIGS. 14–21.

Figure 7:
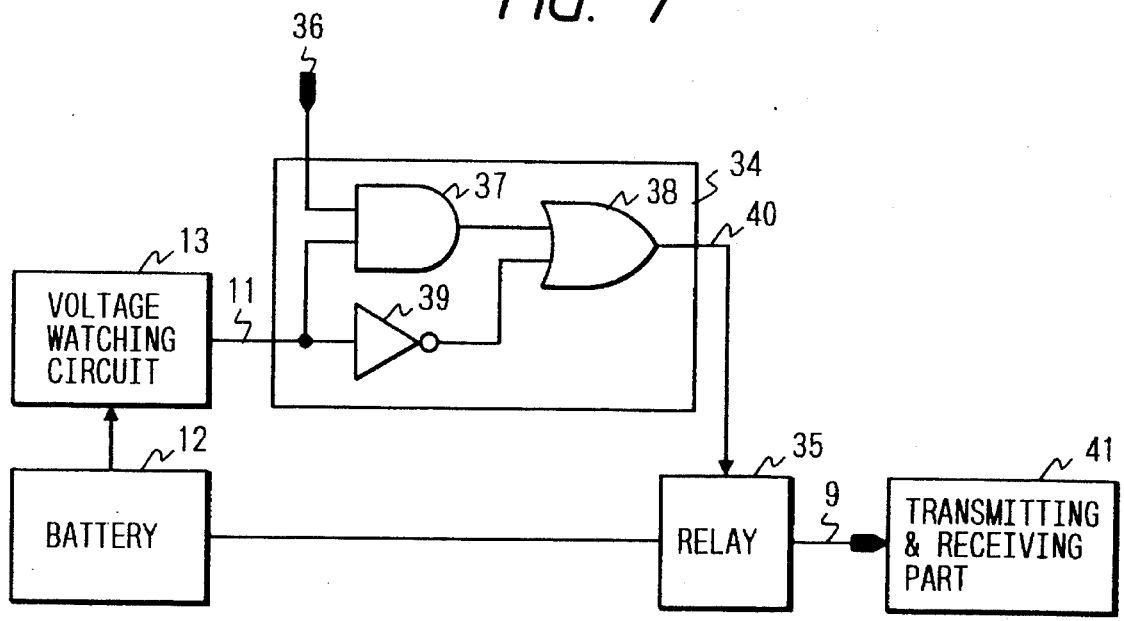
FIG. 7 is a diagram showing operation timing of a mobile wireless communication end device in the prior art.

FIG. 7 shows constitution of main part of a third embodiment of a mobile wireless communication end device according to the present invention. This embodiment is provided with means for selecting the low power operation mode that when power of a cell is consumed significantly, the electric power source is interrupted forcedly and operation of the receiving part is stopped and waiting is not performed. Even if there is no display, a part of operation of the end device is stopped automatically, thereby the user can know that power of the cell is consumed significantly.

The electric power source of a transmitting-receiving part is connected through a relay to a cell 12. A voltage watching circuit 13 observes output voltage of the cell 12, and if the voltage becomes lower than a prescribed value, low voltage operation request signal 11 is outputted. That is, voltage level of the low voltage operation request signal 11 is changed from low level L to high level H. When the end device becomes the talking condition, logic level of audible signal 36 becomes H. The low voltage operation request signal 11 and the audible signal 36 are inputted to a logic circuit 34 (AND circuit 37, OR circuit 38, inverter circuit 39). Output of the logic circuit 34 is supplied as relay control signal 40 to a relay 35. When the relay control signal 40 is high level H, the relay 35 becomes conductive state and electric power is supplied to the transmitting-receiving part 41. In the logic circuit 34 comprising the AND circuit 37, the OR circuit 38 and the inverter circuit 39, when the low power operation request signal 11 is made X, the audible signal 36 is made Y, and the relay control signal 40 is made Z, it follows that $$Z = \overline{X} + X \cdot Y$$

Figure 8:
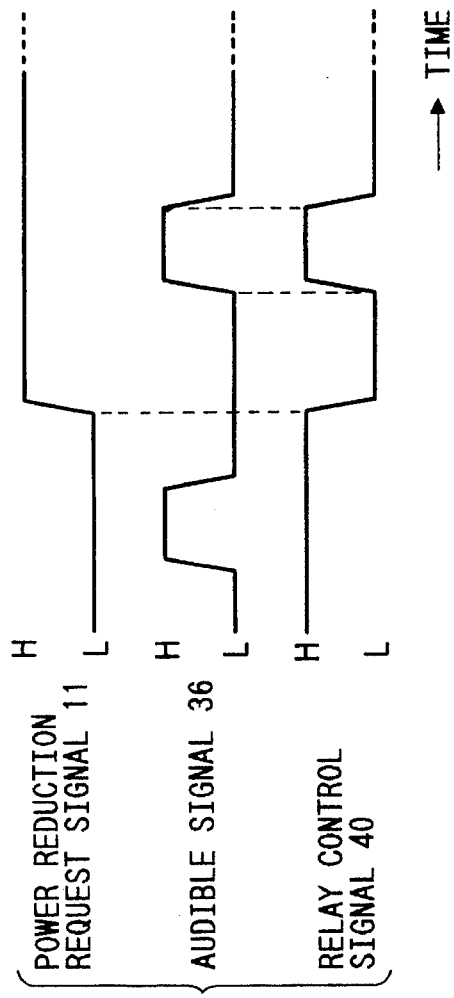
FIG. 8 is a diagram showing an example of operation timing of a third embodiment of a mobile wireless communication end device according to the invention.

According to the circuit 34, as shown in a timing chart of FIG. 8, if the low power operation request signal is low level L, the relay control signal 40 is always high level H, and if the low power operation request signal 11 is high level H, the relay control signal 40 becomes high level only when the audible signal 36 is high level H.

Figure 9:
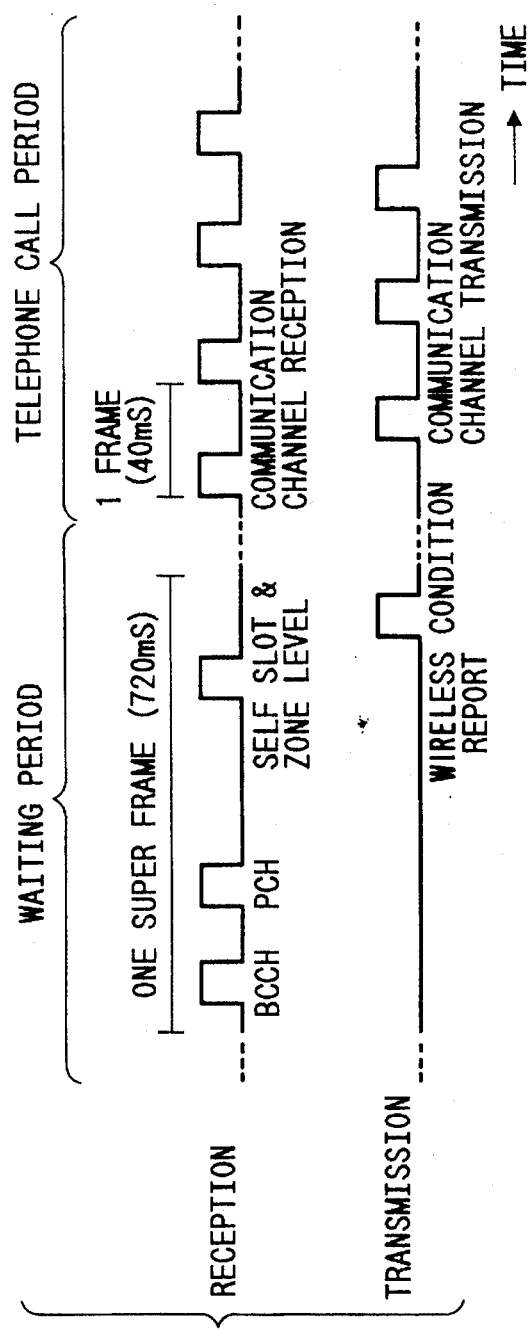
FIG. 9 is a diagram showing constitution of the third embodiment of the mobile wireless communication end device according to the invention.

FIG. 9 shows a timing chart of operation of a general digital mobile wireless communication end device in the prior art in the waiting period and the telephone call period for reference. Even in the waiting period that telephone call is not performed, the digital mobile wireless communication end device performs receiving operation of reception of BCC, reception of PCH, detection of the slot assigned to the station and the level of the radio field magnitude in the zone around the station and transmitting operation of report of the radio field condition, in the base of cycle of 720 ms called super frame. Therefore the end device consumes power even in the waiting period.

Figure 10:
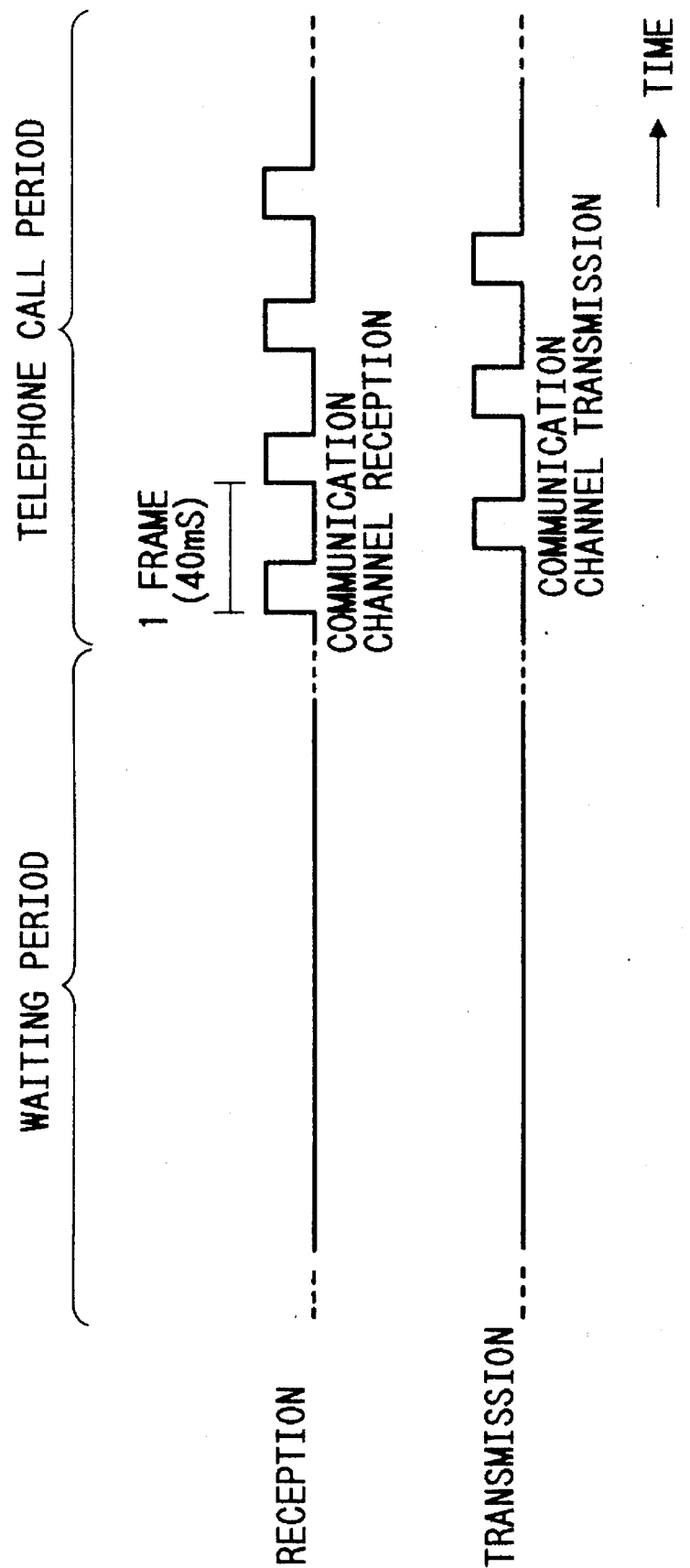
FIG. 10 is a diagram showing relation of input and output of a logic circuit in FIG. 9.

FIG. 10 shows a timing chart of operation of the digital mobile wireless communication end device in the third embodiment in the waiting period and the telephone call period. When lowering of the power source voltage attains to some level, in the waiting period, the electric power source of each part is interrupted forcedly or any transmitting-receiving operation is stopped thereby power consumption of the call is suppressed. In the telephone call period, operation is started again by operation of the user. Such condition is adopted and the matter is left to selection of the user, thereby not only when power of the cell is consumed significantly but also when the power consumption of the cell is forecasted, consumption of the electric power can be reduced and extension of the use time as the end device used exclusively for transmission can be intended.

In the above-mentioned embodiments, outline of constitution in the case of realizing the power source control of the mobile wireless communication end device of the present invention in hardware has been described, but it may be realized by a DSP (digital signal processor) in software.

Figure 11:
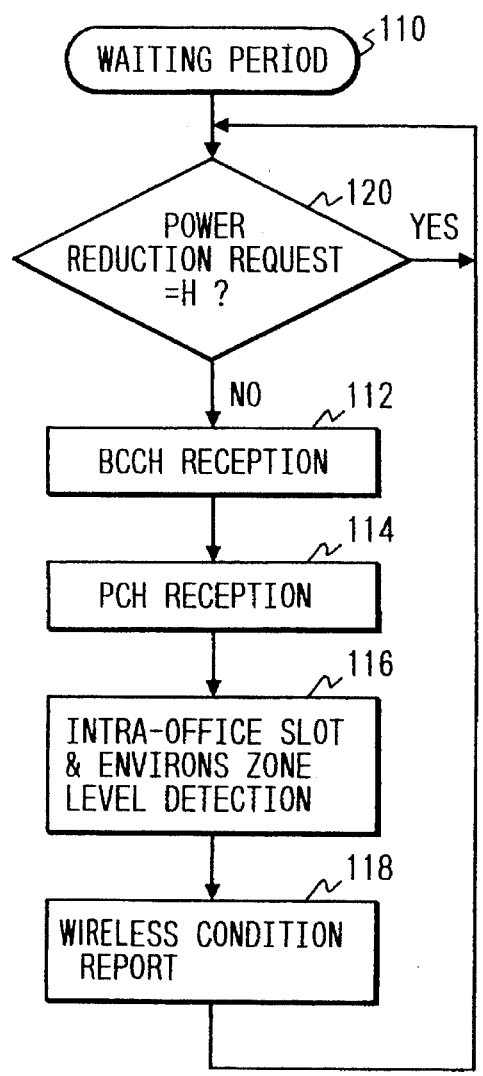
FIG. 11 is a flow chart showing an operation example of the mobile wireless communication end device in the prior art.

FIG. 11 is a flow chart of processing of a control part in the waiting period when the third embodiment of the present invention is realized in software. In the waiting period, the control part views output of the power source watching circuit 13, and if the power reduction request signal 11 is outputted (step 120), as shown in the flow chart, BCC reception step 120, PCH reception step 114, intra-office slot & environs zone level detection step 116 and wireless condition report step 118 are skipped.

Figure 12:
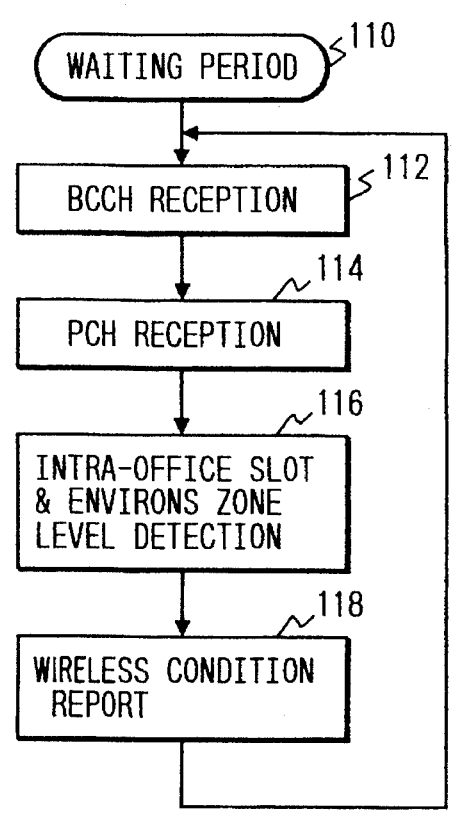
FIG. 12 is a flow chart showing an operation example of the mobile wireless communication end device in the third embodiment.

FIG. 12 is a flow chart of processing of a control part of a digital mobile wireless communication end device in the prior art in the waiting period. When the end device is in the waiting period, the control part comprising a DSP or a logic circuit performs processing of steps 112–118 along this flow.

Figure 13:
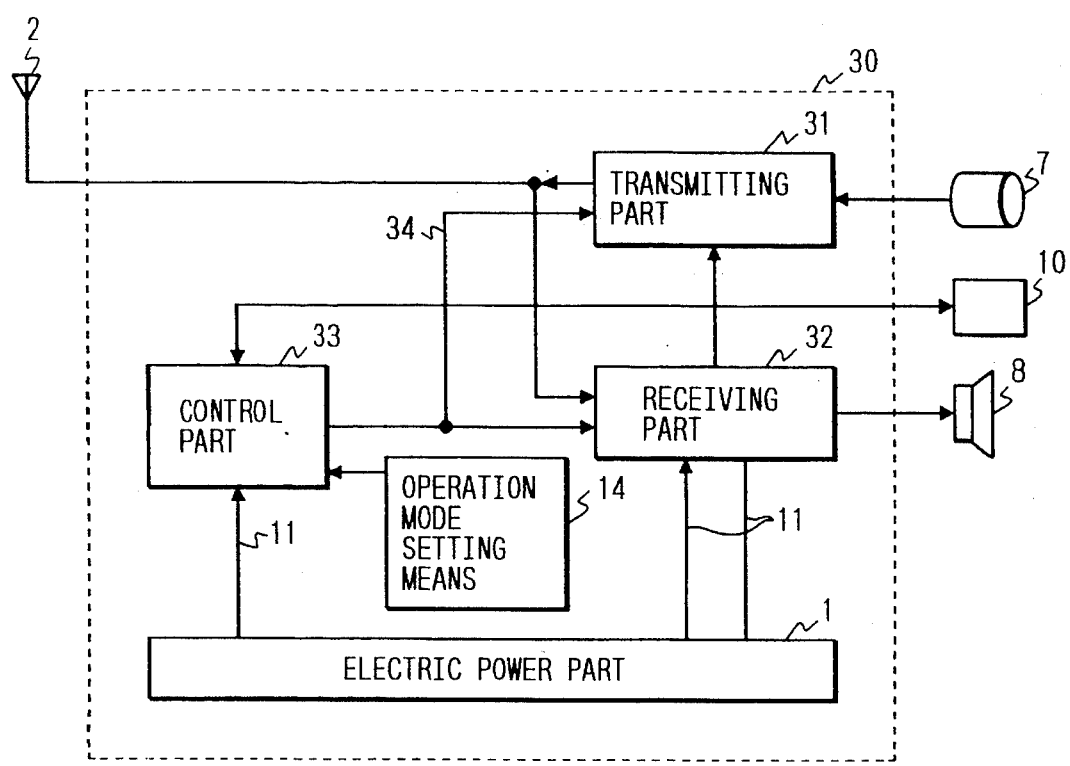
FIG. 13 is a diagram showing a constitution example of a handset of a cordless telephone device according to the invention.

FIG. 13 shows constitution of a handset of a cordless telephone device according to the present invention.

This embodiment is an example where inner signal processing is digital processing. Voice signal inputted from a microphone 7 is subjected to signal processing in a transmitting part 31 and then outputted as aerial electric power from an antenna 2 and transmitted to a base set. On the other hand, aerial electric power transmitted from the base set is received in the antenna 2 and subjected to signal processing by a receiving part 32 and outputted from a speaker 8. A control part 33 observes each part through a control signal line 34 and processes input of a dial from an I/O and display part 10 or the like. In FIG. 13, numeral 30 designates the body of the handset. In FIG. 13, an electric power line 9 is omitted for simplification of the drawings.

Here, an electric power source 1 has similar structure to that of the electric power source 1 shown in FIG. 1, and observes output of a cell 12 and if fall of the power source voltage is detected, the electric power source 1 outputs low power operation request signal to a low power operation request signal line 11. When low power operation mode is set in an operation mode setting means 14, on receiving signal of the signal line 11, each part enters mode to reduce the consumed power similar to the first embodiment and reports power consumption of the cell to the user using the output means 8, 10.

Further when the handset is constituted and signal is outputted to the low power operation request signal line 11, the processing bit number of the digital processing part of each part may be decreased similar to the second embodiment, thereby reduction of the consumed power can be intended and power consumption of the cell can be reported to the used by deterioration of the speaking quality.

Figure 14:
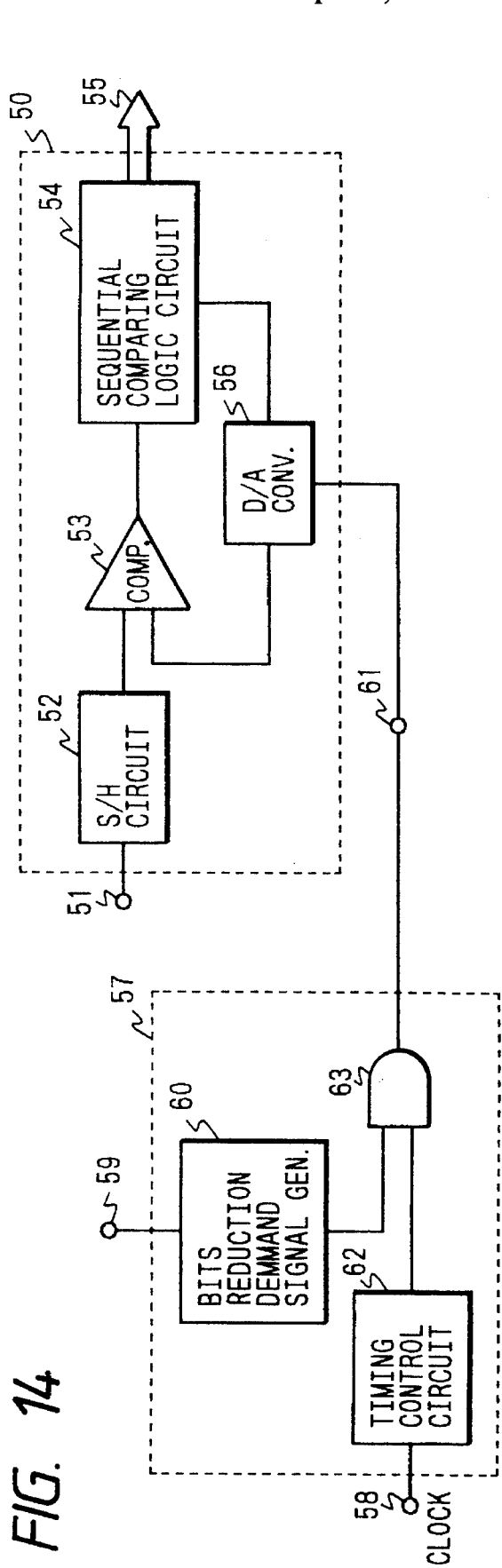
FIG. 14 is a block diagram showing constitution of an embodiment of a successive AD converter to be used in a digital mobile wireless communication end device or the like according to the invention.

FIG. 14 is a block diagram showing constitution of an embodiment of a successive AD converter used for a digital mobile wireless communication end device or the like according to the present invention.

In FIG. 14, constitution of a part 50 except for a timing control circuit 57 is similar to that of a successive AD converter as known conventionally. Analog signal inputted to an analog input terminal 51 is held in a sample and hold circuit 52 until a prescribed sample is coded (one sample cycle). A DA converter 56 is a partial decoding circuit generating reference voltage based on conversion result until the last time in coding process. The analog signal held in the sample and hold circuit 52 is compared with the reference voltage in a voltage comparator 53, and the result is transmitted to a successive comparison logic circuit 54 and stored or outputted and also used for determination of reference voltage in next conversion cycle. A series of procedure to determine output of one bit among the code is hereinafter called a conversion operation. Determination is performed from the most significant bit (hereinafter referred to as "MSB") one by one in sequence, and if the code is output of 8 bits, the conversion operation is repeated 8 times, and also if the code is output of 10 bits, the conversion operation is repeated 10 times, where the repetition is made a conversion cycle and coded digital signal can be obtained.

A timing control circuit 62 generates various timing control signals required for the AD converter to perform normal operation. At normal state, positive logic signal "1" outputted from a bit number reduction signal generating circuit 60 and supplied to an AND circuit 63, and output of the timing control circuit 62 is outputted intact to a clock output terminal 61. When low power operation request signal is inputted to an input terminal 59, the bit number reduction signal generating circuit 60 does not change signal before suitable conversion period occurs, and negative logic signal "0" is outputted after the conversion period to stop conversion occurs, so that output of the AND circuit 63 is not transmitted to the output terminal 61.

FIG. 15 shows a timing chart of the AD converter in FIG. 14. Conversion mode (a) under normal time and conversion mode (b) under bit number reduction time are shown. FIG. 15 shows the case that the bit number of the code is 8. In the conversion mode (b) under bit number reduction time, conversion of lower 4 bits is stopped. During the period that the conversion is stopped, operation of the sample and hold circuit 2, the voltage comparator 3, the DA converter 6 or the like is stopped and the consumed power is reduced. Consequently, in the conversion mode (b) under bit number reduction time, the AD converter performs coding in 4 bits and the quantization level is made little.

Figure 16:
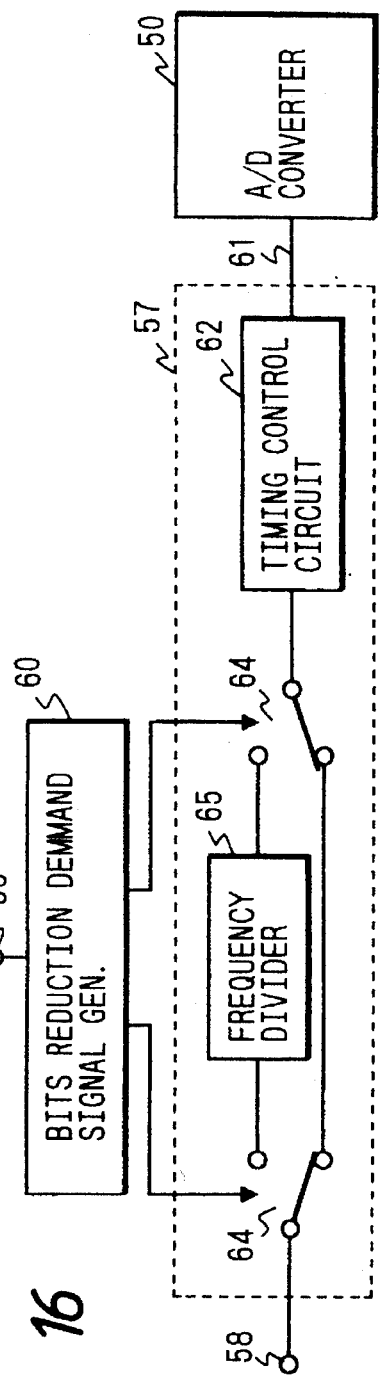
FIG. 16 is a block diagram showing constitution of another embodiment of a successive AD converter to be used in a digital mobile wireless communication end device or the like according to the invention.

FIG. 16 is a block diagram showing constitution of another embodiment of a successive AD converter to be used in a digital mobile wireless communication end device or the like according to the present invention.

In a timing control circuit 57 in FIG. 16, at normal state, a signal changing switch 64 is connected as shown in the figure, and clock signal inputted from a clock input terminal 58 is applied directly to a timing control circuit 62. If low power operation request signal is applied from an input terminal 59 to a bit number reduction signal generating circuit 60, as described in FIG. 17, state is held still before next conversion cycle occurs, and when new conversion cycle is started, at the same time a switch is changed and clock signal is inputted in a frequency demultiplier 65 and frequency of clock signal applied to the timing control circuit 62 is decreased. Also frequency of clock signal of the AD converter 50 is decreased. In this embodiment, the frequency demultiplier 65 is a frequency demultiplier which makes frequency ½ times, but the demultiplication number may be fraction of one divided by number less than 10 with respect to the output bit number. That is, in the case of output of 8 bits, any frequency demultiplier of ½, ¼, ⅛ may be used. However, as the denominator becomes large, the resolution of output is lowered.

Figure 17:
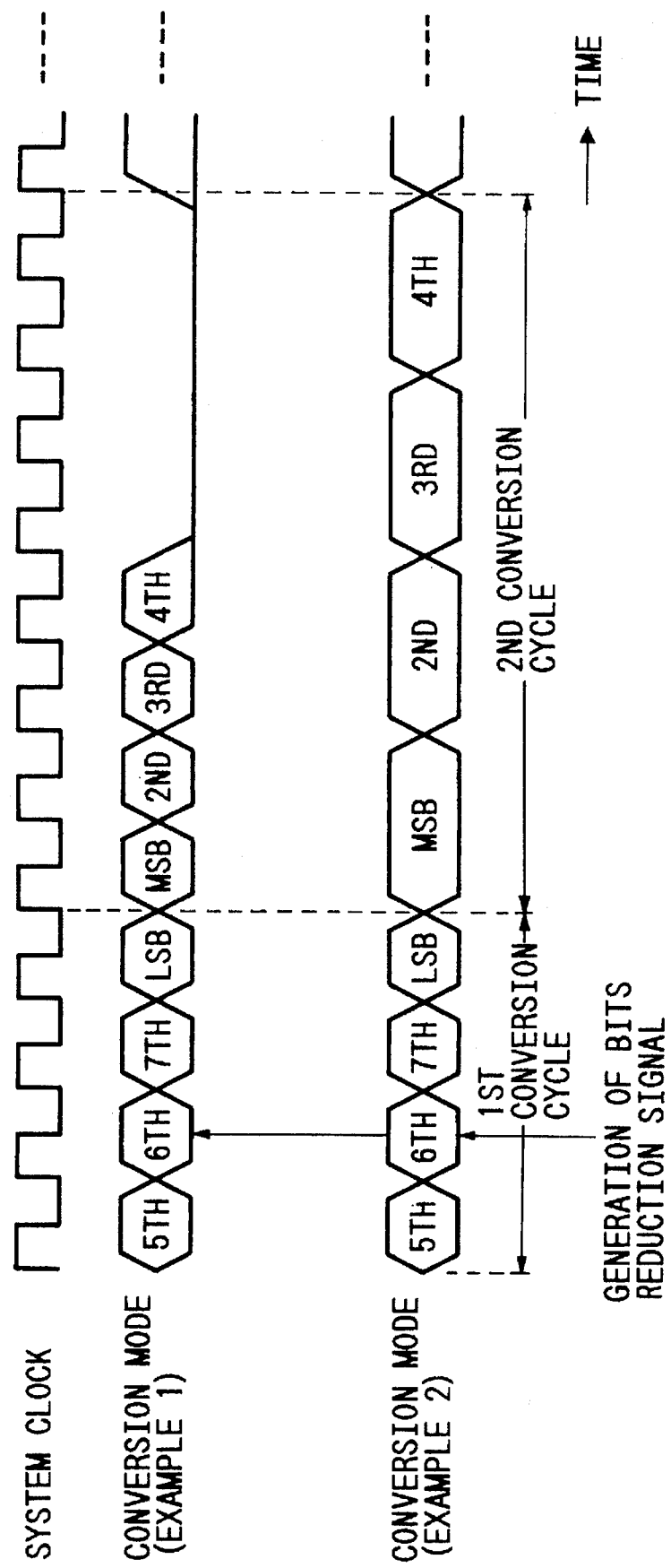
FIG. 17 is a timing chart of converting operation in the bit number reduction signal generating condition of the AD converter in FIG. 14 and FIG. 16.

FIG. 17 is a timing chart of conversion operation in the bit number reduction signal generating time of the AD converters in FIG. 14 and FIG. 16. When the bit number reduction request signal is generated at the midway of the first conversion cycle (sixth bit), the AD converter in FIG. 14 stops operation at conversion state of bits of 5th, 6th, 7th and LSB of next second conversion cycle, as shown in conversion mode (example 1). In the case of the AD converter in FIG. 16, speed of the bit conversion from the second conversion cycle is made ½ with respect to the normal state, and conversion of bits of 5th, 6th, 7th and LSB is not performed.

Figure 18:
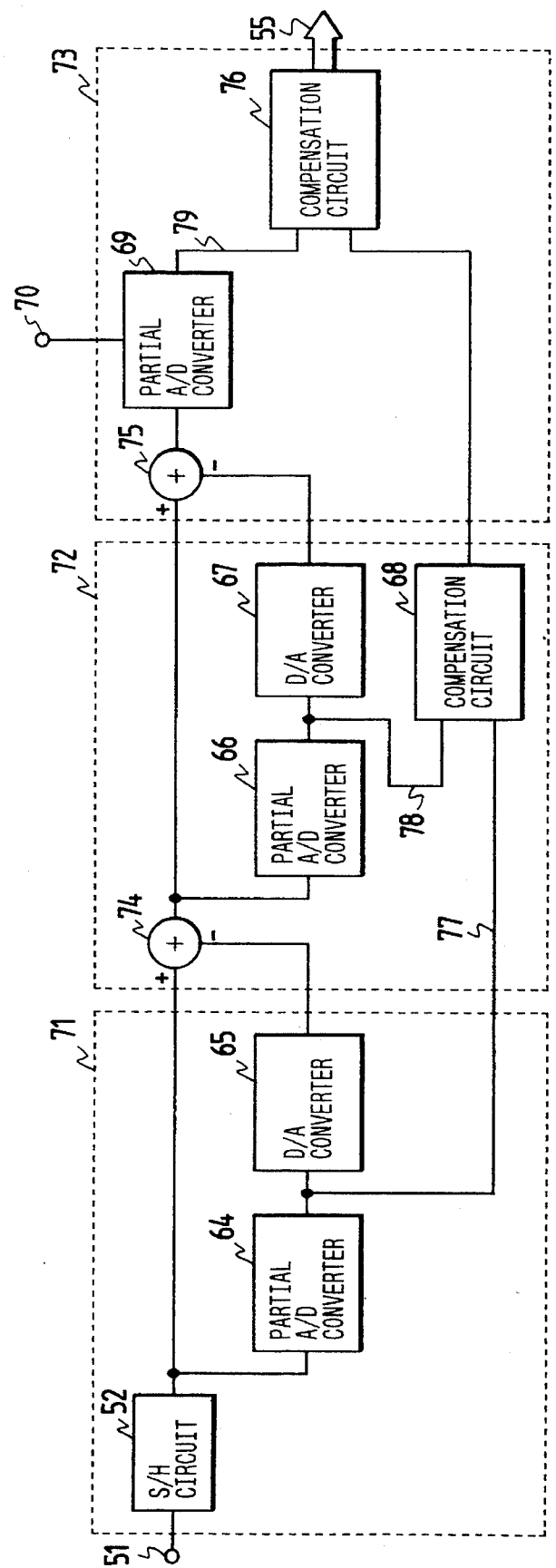
FIG. 18 is a block diagram showing constitution of an embodiment of a pipeline AD converter to be used in a communication end device or the like according to the invention.

FIG. 18 is a block diagram showing constitution of an embodiment of a pipeline AD converter to be used in a communication end device or the like according to the present invention. FIGS. 19A and 19B are timing charts explaining operation of the pipeline AD converter in FIG. 18.

Analog signal inputted from an analog signal input terminal 51 is held in a sample and hold circuit 52 of a first AD conversion block 71. A local AD converter 64 performs AD conversion of value held in the sample and hold circuit 52. Here, the resolution of the local AD converter 64 is made m+1 bits including overlap. Output 77 of the local AD converter 64 is applied to a DA converter 65 and a latch and corrective circuit 68 of a second AD conversion block 72. The output 77 is subjected to DA conversion by the DA converter 65 and returned to analog signal and applied to a residue conversion amplifier 74 of the second AD conversion block 72.

The residue conversion amplifier 74 amplifies difference between output of the sample and hold circuit 52 and output of the DA converter 65 and stores it. The latch and corrective circuit 68 stores the output 77 of the local AD converter 64. A series of operation as above described is performed during one conversion operation shown in C of the first AD converter of FIG. 19A.

In next conversion operation, the first AD conversion block 71 performs a series of above-mentioned conversion operation as conversion operation of D of the first AD converter 64 for new analog value.

On the other hand, a local AD converter 66 of the second conversion block 72 performs AD conversion of output of the residue conversion amplifier 74, and the conversion result is applied to a DA converter 67 and the latch and corrective circuit 68. Here, the resolution of the local AD converter 66 is made n+1 bits including overlap. Output of the local AD converter 66 is subjected to DA conversion by the DA converter 67 and returned to analog value again and applied to a residue conversion amplifier 75. The residue conversion amplifier 75 subtracts output of the DA converter 67 from output of the residue conversion amplifier 74, and amplifies the result and stores it. Also the latch and corrective circuit 68 synthesizes previously stored output 77 of the local AD converter 64 with newly stored output 78 of the local AD converter 66. The output 77 of the local AD converter 64 is made bits of the upper side and the output 78 of the local AD converter 66 is made bits of the lower side, and error produced between these values is absorbed by overlapped one bit included in the output 77 of the local AD converter 64. Thus output of the latch and corrective circuit 68 becomes m+n+1 bits, and the value is applied to a latch and corrective circuit 76 within a third AD conversion block 73 and stored. A series of operation is performed during conversion operation of C of the second AD converter in FIG. 19A.

In next conversion operation, conversion operation of E of the first AD converter of FIG. 19A is performed in the first AD conversion block 71, and conversion operation of D of the second AD converter of FIG. 19A is performed in the second AD conversion block 72 respectively.

Further in the third AD conversion block 73, a local AD converter 69 performs AD conversion of output of the residue conversion amplifier 75, and the output is applied to the latch and corrective circuit 76. When the resolution of the local AD converter 69 is made p, the latch and corrective circuit 76 synthesizes the previously stored value of m+n+1 bits with the value of p bits, and absorbs error by overlapped one bit and outputs the conversion result of m+n+p bits.

Thus the conversion operation of three C in FIG. 19A becomes one conversion cycle and the AD conversion is performed. When the resolution of the local AD converters 64, 66, 69 is made 4, 4, 4 bits respectively, the digital output becomes 10 bits.

The above-mentioned part is the same as that of a pipeline AD converter known conventionally. Further in this embodiment, if bit number reduction request signal is given to an input terminal 70, operation of the local AD converter 69 of the third AD conversion block 73 is stopped and the output 70 is fixed to "0". Consequently, the digital output 55 becomes the resolution of upper m+n bits. Regarding conversion operation of the AD converter, operation of the third AD converter is stopped as shown in FIG. 19B.

In the above-mentioned example, when the bit number reduction request signal is generated, only the third AD conversion block 73 is stopped. However, when the resolution of output may be reduced further, also the second AD conversion block 72 may be stopped.

Figure 20A:
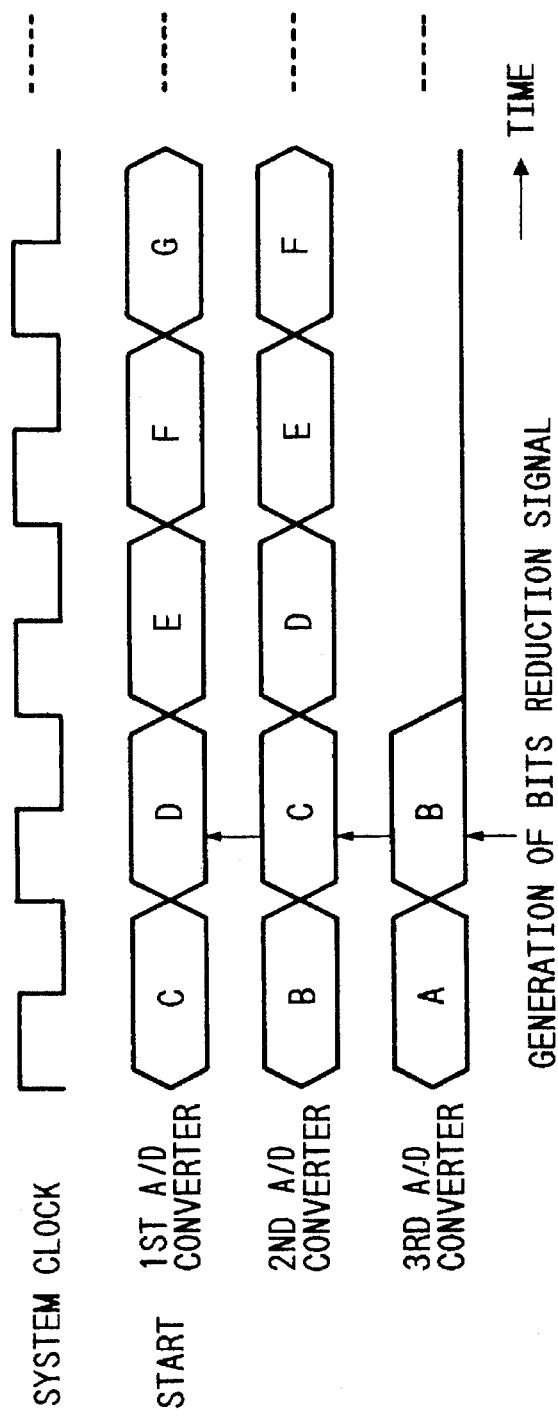
FIGS. 20A and 20B are timing charts in the normal conversion condition and the bit number reduction condition of the AD converter in FIG. 18.
Figure 20B:
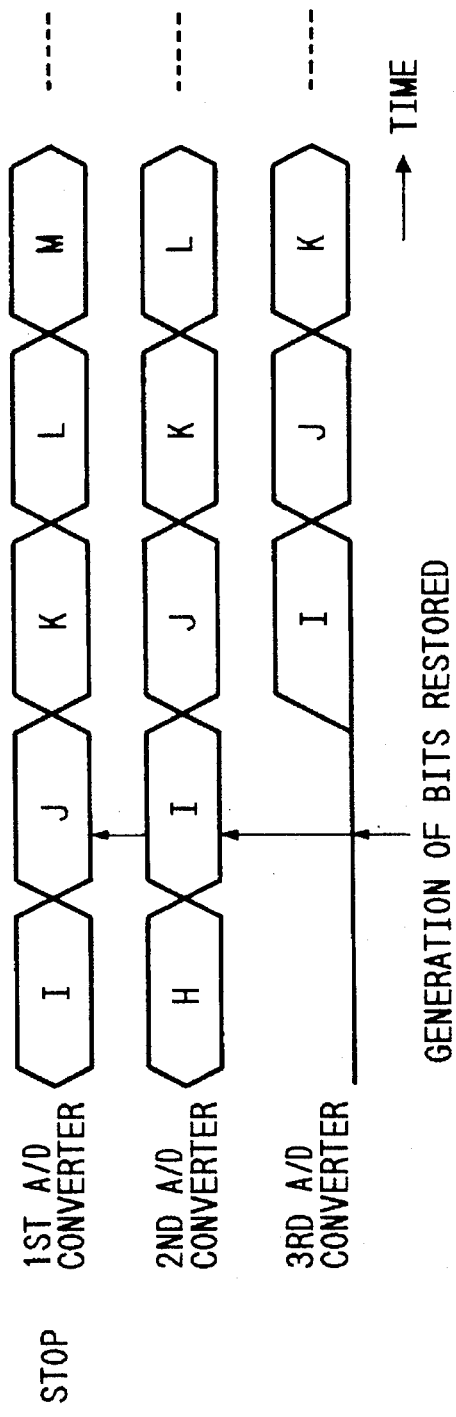

FIGS. 20A and 20B show timing charts of the AD converter in FIG. 18 in changing under normal conversion and under bit number reduction. FIG. 20A shows that bit number reduction request signal comes and the third AD converter stops the conversion operation. FIG. 20B shows that when the third AD converter 73 stops the conversion operation, signal requesting to return the bit number to normal state comes. In any case, state is changed in next but one conversion cycle from arriving signal of bit number reduction or reset.

Figure 21:
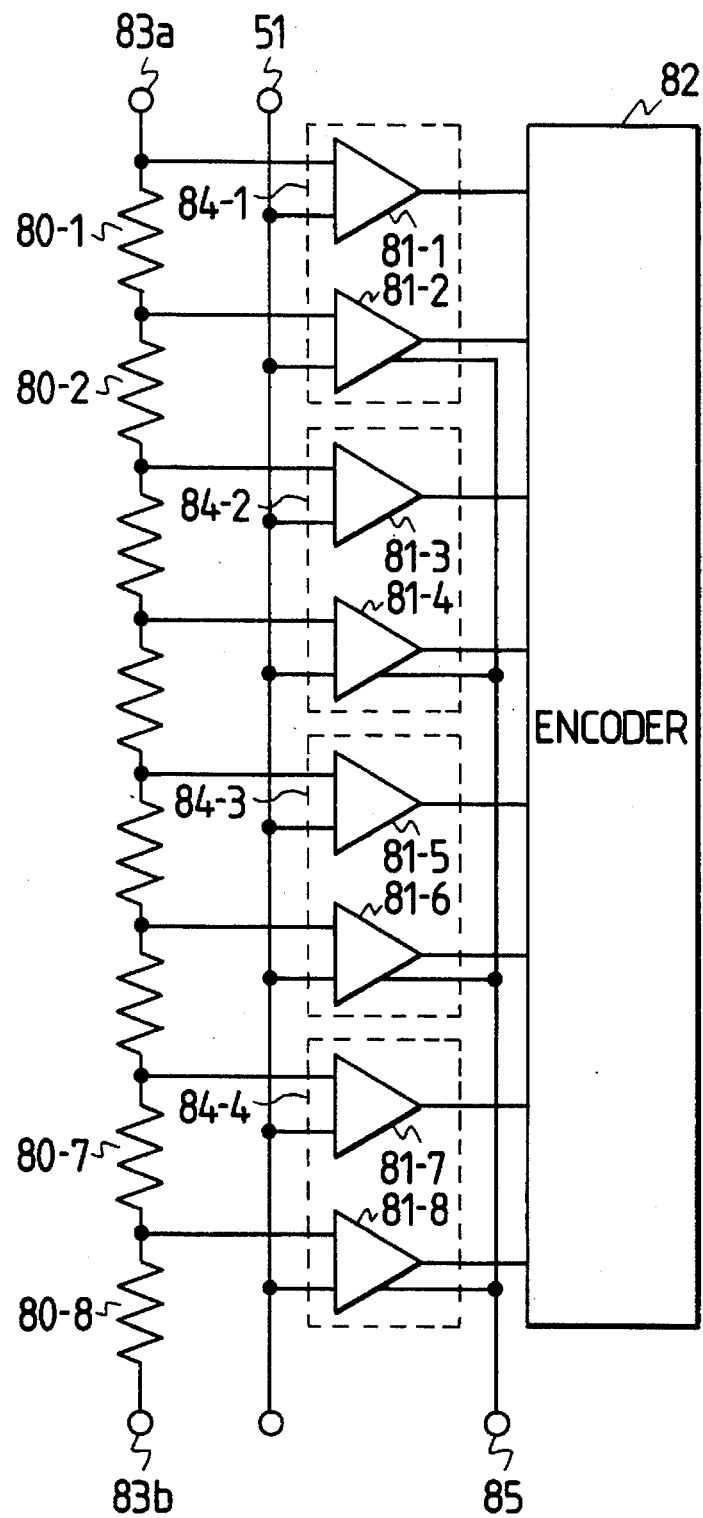
FIG. 21 is a block diagram showing constitution of a parallel comparison AD converter to be used in a communication end device or the like according to the invention.

FIG. 21 is a block diagram showing constitution of an embodiment of a parallel comparison AD converter to be used in a communication end device or the like according to the present invention.

Reference voltage is applied to terminals 83a and 83b on both ends of a dividing resistor 80 connected in series. The potential difference is divided by a plurality of resistors 80-1, 80-2, ... 80-8, and applied as reference voltage Vref to a plurality of voltage comparators 81-1, ... 81-8 respectively. Each voltage comparator 80 compares the reference voltage Vref with input analog voltage Vin applied from an analog input terminal 51, and relations of Vin>Vref and Vin<Vref are made "1" and "0" respectively and applied to an encoding circuit 28. The encoding circuit 28 detects changing positions of group of "1" and group of "0" and outputs them as code signals. In the shown example, since there are eight pieces of the voltage comparators 81, the quantization level number is 8 and the encoding circuit 82 is coded in 3 bits. Bit number reduction request signal is applied from a terminal 85 to every other of the plurality of voltage comparators 81. If the bit number reduction request signal is applied to the terminal 85, the operating voltage comparators 81 are 4 (81-1, 81-3, 81-5, 81-7) in number and the encoding circuit 82 is coded in 2 bits. Thus the number of the operating voltage comparators 81 is reduced thereby the consumed power can be reduced. In FIG. 21, for simplification of description, although use of eight pieces of the voltage comparators 81 is shown, the invention is not limited to this. In general, when m-th power (m:integer) of 2 pieces of voltage comparators are used, they are divided in every n-th power (n:integer) of 2 pieces as one set. Then (m-n)th power of 2 sets can be constituted, and if only one voltage comparator having highest reference voltage among one set is operated or stopped, the AD converter of m-n bits can be constituted. For example, the parallel comparison AD converter of 10 bits has 1024 pieces of voltage comparators, and if they are divided in every 8 pieces (third power of 2 pieces) as one set, 128 sets (7-th power of 2 sets) can be constituted. If only one voltage comparator having the highest reference voltage is operated in each set, since 128 pieces of the voltage comparators are operated, this has the resolution of 7 bits substantially.

The embodiments of the present invention have been described, but the invention is not limited to the embodiment. The AD converter described in FIGS. 14 ... 21 can be used not only in a mobile wireless communication end device, but also in an electronic apparatus operating in power saving having the AS converter as constituent.

We claim:

1. A mobile communication end device having an electric power source including a cell, and a signal processing part and a transmitting-receiving part, to which electric power is applied from said electric power source, wherein said signal processing part and said transmitting-receiving part have a normal operation mode operating at normal electric power and a low power operation mode operating at electric power lower than the normal operation mode, said mobile communication end device comprising:

operation mode setting means for setting in response to an input signal an operation mode of said signal processing part and said transmitting-receiving part of said mobile communication end device to said normal operation mode or said low power operation mode;

said operation mode setting means includes means for reducing the number of bits of a signal processed by said signal processing part, thereby reducing resolution of said signal, when said low power operation mode has been set by said operation mode setting means and when operating said signal processing port and said transmitting-receiving part of said mobile communication end device in said low power operation mode;

said electric power source having observing means for observing the voltage of said cell and for generating a low power operation request signal when said voltage becomes a prescribed value or less; and means for changing said signal processing part and said transmitting-receiving part into said low power operation mode, when the low power operation mode is set by said operation mode setting means and when the low power operation request signal is generated by said observing means.

2. A mobile communication end device according to claim 1 wherein said signal processing part has a successive analog/digital ((A/D)) converter for converting an analog voltage signal into a digital value, and said successive A/D converter has means, responsive to said means for reducing, for stopping a coding operation of lower bits, when the low power operation mode is set by said operation mode setting means and when the low power operation request signal is generated by said observing means.

3. A mobile communication end device according to claim 1 wherein said signal processing part has a successive analog/digital (A/D) converter for converting an analog voltage signal into a coded digital value, and said successive A/D converter has means for lowering the speed of A/D conversion of each conversion cycle without varying the coding period of one example, when the low power operation mode is set by said operation mode setting means and when the low power operation request signal is generated by said observing means.

4. A mobile communication end device according to claim 1 wherein said signal processing part has a pipeline analog/digital (A/D) converter for converting a analog voltage signal into a coded digital value, and said pipeline A/D converter has means, responsive to said means for reducing, for stopping a coding operation of lower bits, when the low power operation mode is set by said operation mode setting means and when the low power operation request signal is generated by said observing means.

5. A mobile communication end device according to claim 1 wherein said signal processing part has a parallel comparison analog/digital (A/D) converter for converting an analog voltage signal into a coded digital value, and said parallel comparison A/D converter has a plurality of comparators with the number equal to the quantization level number for comparing a quantization level voltage with the analog voltage signal, a voltage generating circuit for generating the quantization level voltage, an encoder for converting outputs of the plurality of comparators into the coded digital value, and means, responsive to said means for reducing, for stopping operation of a specified comparator among neighboring voltage comparators grouped in each set of a power of 2 piece of the plurality of comparators, when the low power operation mode is set by said operation mode setting means and when the low power operation request signal is generated by said observing means.

6. A mobile communication end device having an electric power source including a cell, a signal processing part and a transmitting-receiving part, to which electric power is applied from said electric power source, and an I/O and display device of said signal processing part, wherein said signal processing part and said transmitting-receiving part have a normal operation mode at normal electric power and a low power operation mode operating at electric power lower than the normal operation mode, said mobile communication end device comprising:

operation mode setting means for setting, in response to an input signal, an operation mode of at least one of said signal processing part and said transmitting-receiving part;

said operation mode setting means includes means for reducing the number of bits of a signal processed by said signal processing part, thereby reducing resolution of said signal, when said low power operation mode of said signal processing part has been set by said operation mode setting means and when operating said signal processing part in said low power operation mode;

observing means for observing the voltage of said cell and for generating a low power operation request signal when the voltage becomes a prescribed value or less; and means for outputting an indication of the changing of the operation mode to said I/O and display device, and for changing the operation mode of at least one of said signal processing part and said transmitting-receiving part to a low power operation mode, when low power operation mode is set by said operation mode setting means, and when the voltage of the electric power source becomes a prescribed value or less.

7. A mobile communication end device according to claim 6:

in which said signal processing part has a successive analog/digital (A/D), converter for converting an analog voltage signal into a coded digital value, and said successive A/D converter has means, responsive to said means for reducing, for stopping coding operation of lower bits, when the low power operation mode of said signal processing part is set by said operation mode setting means and when said voltage of said electric power source becomes a prescribed value or less.

8. A mobile communication end device according to claim 6 wherein said signal processing part has a pipeline analog/digital (A/D) converter for converting an analog voltage signal into a coded digital value, and said pipeline A/D converter has means, responsive to said means for reducing, for stopping a coding operation of lower bits, when the low power operation mode of said signal processing part is set by said operation mode setting means and when said voltage of said electric power source becomes a prescribed value or less.

9. A mobile communication end device according to claim 6 wherein said signal processing part has a parallel comparison analog/digital (A/D) converter for converting an analog voltage signal into a coded digital value, and said parallel comparison A/D converter has a plurality of comparators with the number equal to the quantization level number for comparing a quantization level voltage with the analog voltage signal, a voltage generating circuit for generating the quantization level voltage, an encoder for converting outputs of the plurality of comparators into the coded digital value, and means, responsive to said means for reducing, for stopping operation of a specified comparator among neighboring voltage comparators grouped in each set of a power of 2 pieces of the plurality of comparators, when the low power operation mode is set by said operation mode of said signal processing part setting means and when said voltage of said power source becomes a prescribed value or less.

10. A mobile communication end device having an electric power source including a cell, a signal processing part and a transmitting-receiving part, to which electric power is applied from said electric power source, and an I/O and display device of said signal processing part, wherein said signal processing part and said transmitting-receiving part have a normal operation mode operating at normal electric power and a low power operation mode operating at electric power lower than the normal operation mode, said mobile communication end device comprising:

means for stopping reception operation in a waiting condition and performing only a transmission operation during said low power operation mode;

operation mode setting means for setting, in response to an input signal, an operation mode of said signal processing part and said transmitting-receiving part to said normal or said low power operation modes;

said operation mode setting means includes means for reducing the number of bits of a signal processed by said signal processing part, thereby reducing resolution of said signal, when said low power operation mode has been set by said operation mode setting means and when operating said signal processing part and said transmitting-receiving part of said mobile communication end device in said low power operation mode;

observing means for observing voltage of said cell and for generating a low power operation request signal when said voltage becomes a prescribed value or less;

changing means for changing said signal processing part and said transmitting-receiving part into said low power operation mode, when said voltage of said cell is a prescribed value or less and when said low power operation mode is set by said operation mode setting means.

11. A mobile communication end device according to claim 10 wherein said signal processing part has a successive analog/digital (A/D) converter for converting an analog voltage signal into a coded digital value, and said successive A/D converter has means, responsive to said means for reducing, for stopping a coding operation of lower bits, when said voltage of said cell is a prescribed value or less and when low power operation mode is set by said operation mode setting means.

12. A mobile communication end device according to claim 10, wherein said signal processing part has a pipeline analog/digital (A/D) converter for converting an analog voltage signal into a coded digital value, and said pipeline A/D converter has means, responsive to said means for reducing, for stopping a coding operation of lower bits, when said voltage of said cell is a prescribed value or less and when said low power operation mode is set by said operation mode setting means.

13. A mobile communication end device according to claim 10, wherein said signal processing part has a parallel comparison analog/digital (A/D) converter for converting an analog signal into a coded digital value, and said parallel comparison A/D converter has a plurality of comparators with the number equal to the quantization level number for comparing a quantization level voltage with the analog voltage signal, a voltage generating circuit for generating the quantization level voltage, an encoder for converting outputs of the plurality of comparators into the coded digital value, and means, responsive to said means for reducing, for stopping operation of a specified comparator among neighboring voltage comparators grouped in each set of a power of 2 pieces of the plurality of comparators, when said voltage of said cell is a prescribed value or less and when said low power operation mode is set by said operation mode setting means.

14. A mobile communication end device according to claim 10, wherein said signal processing part has a successive analog/digital (A/D) converter for converting an analog voltage signal into a coded digital value, and said successive A/D converter has means for lowering the speed of A/D conversion of each conversion cycle without varying the coding period of one sample, when said voltage of said cell is a prescribed value or less and when said low power operation mode is set by said operation mode setting means.

15. A mobile communication end device having an electric power source including a cell, a signal processing part and transmitting-receiving part to which electric power is applied from said electric power source, and an I/O and display device of said signal processing part, said mobile communication end device comprising:

operation mode setting means for setting in response to an input signal, an operation mode of said mobile communication end device to a normal operation mode operating at normal electric power or a low power operation mode operating at electric power lower than the normal operation mode and reducing the number of bits of a signal processed by said signal processing part, thereby reducing resolution of said signal, when said low power operation mode has been set by said operation mode setting means and when operating said mobile communication end device in said low power operation mode;

said electric power source having observing means for observing the voltage of said cell and for generating a low power operation request signal when the voltage becomes a prescribed value or less; and control means for reducing the resolution of said signal processing part and stopping a reception operation of said transmitting-receiving part in a waiting condition, when the low power operation mode is set by said operation mode setting means and when the low power operation request signal is generated by said observing means.

16. A mobile communication end device according to claim 15, wherein said signal processing part has a successive analog/digital (A/D) converter for converting an analog voltage signal into a coded digital value, and said successive A/D converter has means, responsive to the reducing of the number of bits of said signal processed by said signal processing part, for stopping a coding operation of lower bits, when said low power operation mode is set by said operation mode setting means and when said low power operation request signal is generated by said observing means.

17. A mobile communication end device according to claim 15, wherein said signal processing part has a successive analog/digital (A/D) converter for converting an analog voltage signal into coded digital value, and said successive A/D converter has means for lowering speed of A/D conversion of each conversion cycle without varying a coding period of one example, when said low power operation mode is set by said operation mode setting means and when said ow power operation request signal is generated by said observing means.

18. A mobile communication end device according to claim 15, wherein said signal processing part has a pipeline analog/digital (A/D) converter for converting an analog voltage signal into a coded digital value, and said pipeline A/D converter has means, responsive to the reducing of the number of bits of said signal processed by said signal processing part, for stopping a coding operation of lower bits, when said low power operation mode is set by said operation mode setting means and when said low power operation request signal is generated by said observing means.

19. A mobile communication end device according to claim 15, wherein said signal processing part has a parallel comparison analog/digital (A/D) converter for converting an analog voltage signal into coded digital value, and said parallel comparison A/D converter has a plurality of voltage comparators and means, responsive to the reducing of the number of bits of said signal processed by said signal processing part, for stopping operation of a specified comparator among neighboring voltage comparators grouped in each set of a power of 2 pieces of the plurality of comparators, when said low power operation mode is set by said operation mode setting means and when said low power operation request signal is generated by said observing means.

20. A mobile communication end device according to claim 15, wherein said signal processing part has a parallel comparison analog/digital (A/D) converter for converting an analog voltage signal into a coded digital value, and said parallel comparison A/D converter has a plurality of comparators with the number equal to the quantization level number for comparing a quantization level voltage with the analog voltage signal, a voltage generating circuit for generating the quantization level voltage, an encoder for converting outputs of the plurality of comparators into the coded digital value, and means, responsive to the reducing of the number of bits of said signal, processed by said signal processing part, for stopping operation of a specified comparator among neighboring voltage comparators grouped in each set of a power of 2 pieces of the plurality of comparators, when said low power operation mode is set by said operation mode setting means and when said low power operation request signal is generated by said observing means.

* * * * *